(12) United States Patent
Pfeiffer

(10) Patent No.: US 8,515,575 B2
(45) Date of Patent: Aug. 20, 2013

(54) MOBILE AUTOMATIC ORDER SELECTION SYSTEM CAPABLE OF RESPONDING TO SIMULTANEOUS ORDER REQUESTS

(75) Inventor: Jeffrey Pfeiffer, Nazareth, PA (US)

(73) Assignee: Paragon Technologies, Inc., Easton, PA (US)

( * ) Notice: Subject to any disclaimer, the term of this patent is extended or adjusted under 35 U.S.C. 154(b) by 315 days.

(21) Appl. No.: 12/839,031

(22) Filed: Jul. 19, 2010

(65) Prior Publication Data

US 2012/0016515 A1    Jan. 19, 2012

(51) Int. Cl.
*G06F 17/00* (2006.01)
(52) U.S. Cl.
USPC ............ 700/242; 700/244; 700/240; 414/273
(58) Field of Classification Search
USPC ................. 700/236, 241, 242, 243; 414/273, 414/276
See application file for complete search history.

(56) References Cited

U.S. PATENT DOCUMENTS

| | | | |
|---|---|---|---|
| 5,271,703 A * | 12/1993 | Lindqvist et al. ............. | 700/216 |
| 5,704,758 A | 1/1998 | Davis et al. | |
| 6,170,929 B1 * | 1/2001 | Wilson et al. ................. | 700/243 |
| 6,247,890 B1 * | 6/2001 | Chang et al. ............... | 414/795.7 |
| 6,308,109 B1 * | 10/2001 | Yuyama et al. ............... | 700/228 |
| 6,325,586 B1 | 12/2001 | Loy | |
| 6,354,783 B1 | 3/2002 | Stoy et al. | |
| 6,409,499 B1 * | 6/2002 | Feldermann ...................... | 431/8 |
| 6,602,037 B2 | 8/2003 | Winkler | |
| 6,775,588 B1 * | 8/2004 | Peck ............................. | 700/214 |
| 2003/0233165 A1 | 12/2003 | Hein et al. | |
| 2008/0201013 A1* | 8/2008 | Schaefer ....................... | 700/244 |

* cited by examiner

Primary Examiner — Timothy Waggoner
(74) Attorney, Agent, or Firm — Drinker, Biddle & Reath, LLP

(57) ABSTRACT

A mobile fulfillment device, system, and method for retrieving at least one article stored in one of a plurality of predetermined storage locations are disclosed. The device, system and method includes a wireless transceiver for communicating with a remote system controller, including transmission of at least one instruction from the remote system controller to provide instruction to the control system, a retriever for retrieving the at least one article in response to instruction received from the control system, a sensor for detecting inventory levels of articles in at least one predetermined storage location, a mobile frame supporting the fulfillment device and at least three wheels coupled to the mobile frame and providing mobility to the fulfillment device based on at least one of the at least three wheels being a lockable wheel.

25 Claims, 4 Drawing Sheets

MOBILE AUTOMATIC ORDER SELECTION SYSTEM CAPABLE OF RESPONDING TO SIMULTANEOUS ORDER REQUESTS

An order selection system is disclosed, having at least one mobile, selectably positionable dispensing unit. Each dispensing unit is responsive to a system controller and retrieves items from storage locations in storage magazines located on each unit. The retrieved items are automatically dispensed into a tote or carton on a moving conveyor, or dispensed onto a moving belt in an assigned order space on the belt under control of the system controller. The system controller responds to an order request specifying items to be retrieved and dynamically assigns space on the moving belt or conveyor so that a plurality of selected order requests may be serviced simultaneously.

BACKGROUND

The storage and retrieval capabilities of order fulfillment systems must keep up with the demand of the ever increasing variety of products available, such as pharmaceutical products; cosmetics; contact lenses; clothing; audio and video media; books; and many more products. Increasing demand correspondingly creates a need to increase the storage and retrieval capabilities of order fulfillment facilities stocking such products. Warehouse systems have been automated and, more particularly, are controlled by various computerized systems, to facilitate retrieval.

Many order fulfillment facilities are "fixed" in the sense that their various elements (storage magazines in particular) are not easily rearranged or supplemented to meet changing demand. Demand for some products may also be cyclical. The cyclical demand may be caused by, for example, holidays. The cyclical demand correspondingly creates a need for additional, but temporary, increases in storage and retrieval capabilities of the order fulfillment facilities.

Thus, a need exists for a mobile automatic order selection system that can be added to or removed from a fixed automatic order selection system as demand increases or decreases.

SUMMARY

A mobile fulfillment device, a mobile fulfillment system, and a mobile fulfillment method for retrieving at least one article stored in one of a plurality of predetermined storage locations are disclosed. The device, system, and method include a wireless transceiver for communicating with a remote system controller, including transmission of at least one instruction from the remote system controller to provide instruction to a control system, a dispenser for dispensing the at least one article in response to instruction received from the control system, a sensor for detecting inventory levels of articles in at least one predetermined storage location, a mobile frame supporting said fulfillment device, and at least three wheels coupled to the mobile frame and providing mobility to the fulfillment device based on at least one of the at least three wheels being a lockable wheel.

The device, system, and method also include a plurality of storage locations for accommodating additional inventory of the at least one article.

The device, system, and method include a battery for providing electrical power to at least partially operate the device.

The device, system, and method include an external power (120 volt) connection for providing electrical power to at least partially operate the device.

The device, system, and method include at least one modular connection to enable interconnection of the mobile fulfillment device with at least one other mobile fulfillment device to expand the capacity of an order fulfillment facility.

The device, system, and method also include a system controller that receives order selection information and generates instructions based on the received order selection information.

The device, system, and method also include a conveyor receivably coupled with the mobile fulfillment device to accept the at least one product retrieved by the retriever and adapted to transport the accepted at least one product in fulfillment of the order.

The device, system, and method also include a tracker for tracking at least one product on said conveyor.

BRIEF DESCRIPTION OF THE FIGURES

Understanding of the disclosed embodiments will be facilitated by consideration of the following detailed description taken in conjunction with the accompanying drawings, in which like numerals refer to like parts.

DETAILED DESCRIPTION OF THE DISCLOSED EMBODIMENTS

It is to be understood that the figures and descriptions herein are simplified to illustrate elements that are relevant for a clear understanding of the disclosure, while eliminating, for the purpose of clarity, many other elements found in order fulfillment and delivery systems. Those of ordinary skill in the art may recognize that other elements and/or steps are desirable and/or required in implementing the disclosed embodiments. Elements and steps well known in the art, or that do not facilitate a better understanding of the disclosure, are not disclosed. The disclosure is directed to variations and modifications to disclosed elements and methods that will be known to those skilled in the art.

Figure 1:
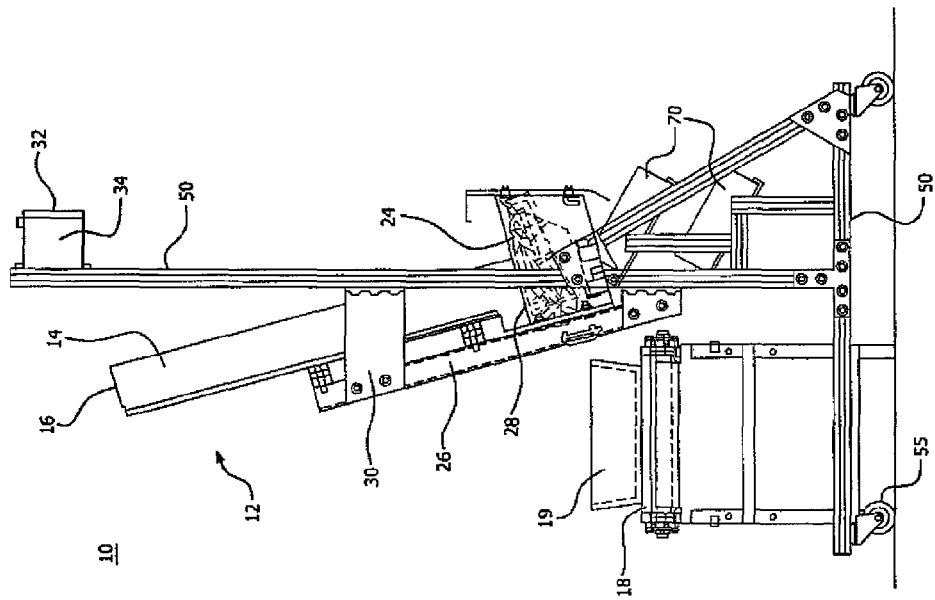
FIG. 1 is an illustration of a side view of a storage module of the mobile automated dispensing unit disclosed herein.

A computerized order selection system 10 is illustrated in FIG. 1. System 10 includes a mobile storage module 12 used for storing or stocking items within an order fulfillment facility or warehouse. System 10 may include a plurality of mobile storage modules 12, but for the sake of clarity a single mobile storage module 12 is shown in FIG. 1. System 10 operates to retrieve the items or products 14 in storage locations 16 of storage module 12, and delivers retrieved items onto a conveyor 18 comprising a moving belt, for example. Articles may be dispensed directly onto conveyor 18, or, may include a designated order tote 19 transported by conveyor 18. Storage locations 16 and items 14 may have discrete positions such as storage locations 16.1 containing products 14.1, for example. That is, specific storage locations may be associated with specific items.

Storage 12 module operates under the control of microprocessor 32, which receives instructions from a system controller (not shown) that communicates with microprocessor 32 through a wireless electronic connection. Microprocessor 32 receives order selection data from the system controller and communicates with individual dispensers 24 on storage module 12 to direct dispensing of items 14 onto conveyor 18 or into one or more totes 19 moving along conveyor 18.

The system controller is capable of retrieving, storing, and organizing order selection data from external sources, such as order software and file systems. This order selection data may be retrieved from external sources, such as computer files and/or socket-type communications. The system controller may be aided in the order selection process by other external devices such as barcode readers, RF readers, external computer files, internal queuing methods, and other like technologies. As the system controller retrieves and organizes the order selection data, that information may be transmitted to microprocessor 32 via a wireless communication connection for further processing.

Figure 2:
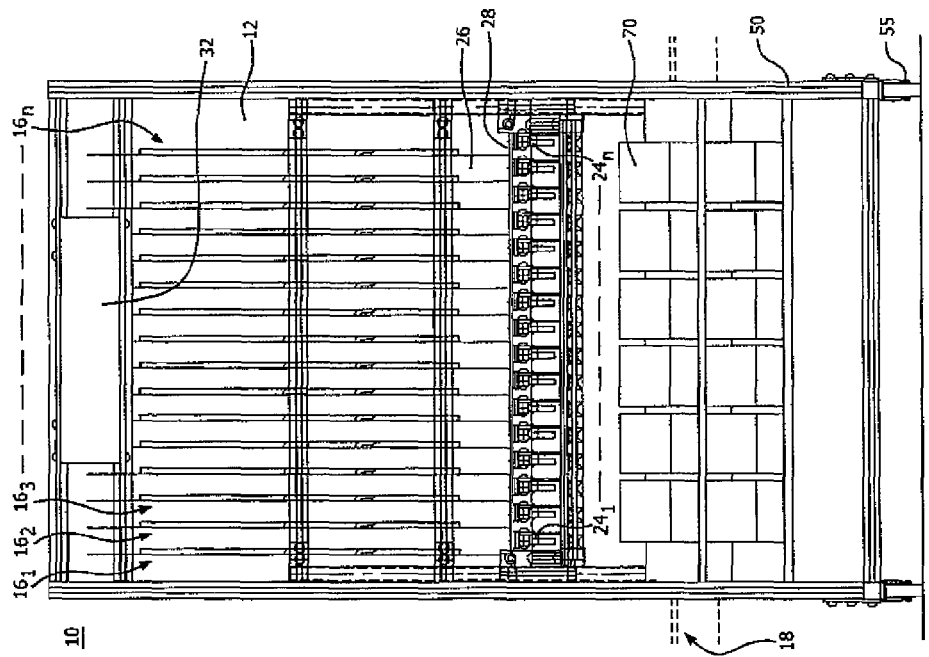
FIG. 2 is an illustration of a lateral view of the storage module of FIG. 1, wherein the view is oriented approximately ninety degrees from the side view.

Referring to FIGS. 1 and 2 collectively, storage module 12 may be supported by frame 50 that may have a support base and a vertical framework. Frame 50 is designed to prevent tipping of storage module 12. Frame 50 may be provided with wheels 55, or other device providing for ease of moving storage module 12, to provide and/or aid mobility of storage module 12. Optionally, storage module 12 may be fixed in position via mechanical fasteners, which may be used instead of or in addition to wheels 55.

Storage module 12 is designed to be mobile, to enable storage module 12 to be inserted into system 10 during periods of high demand in order to service increased order levels, and to be removed during slower demand periods as storage module 12 becomes unnecessary. Storage module 12 may be positioned adjacent to, or in proximity with, various types of conveying equipment, such as the equipment described in U.S. Pat. No. 5,271,703, by way of non-limiting example only. Once storage module 12 is positioned, one or more wheels 55 may be locked to maintain its position during operation. Storage module 12 may be adjusted vertically to match the height of the conveying equipment that the module is being positioned to operate with. This height adjustment may also enable operation with a myriad of carton height combinations. Storage module 12 may include hinges and other mechanisms to allow for folding and/or collapsing to aid in transportation and/or storage.

Storage module 12 communicates with system controller via a transceiver and microprocessor 32. Storage module 12 typically receives external power, such as from an external 120 VAC power source, and may include a battery that may be charged in advance to provide operation over a period of time. Storage module 12 may also include additional storage locations 70 that may accommodate the storage of additional product inventory proximate to storage locations 16. This additional product inventory may be used to replenish storage locations 16 when products 14 contained therein are depleted.

Storage module 12 may include a dispenser 24. Dispenser 24 may take the form of a movable dispenser and/or stationary dispenser, for example. Dispenser 24 may take the form of a solenoid, belt and actuator, or piston type dispenser, by way of non-limiting examples only. For example, dispenser 24 may have at least one vertically extending and movable cog and is further described in U.S. Pat. No. 5,271,703 entitled "Automatic Order Selection System Capable Of Responding to Simultaneous Order Requests" that issued Dec. 21, 1993 with inventors Lindqvist et al.

Dispenser 24 may dispense product 14 onto conveyor 18. Storage module 12 may have one or more chutes 26 positioned to intercept product 14 after it slides down product support plate 28. As seen in FIG. 1, products 14 slide down sloped members 27 (not shown in FIG. 1, shown in FIG. 3) positioned under plates 28, and are directed onto conveyor 18.

Dispenser 24 may be moved in response to a drive which, in turn, is responsive to microprocessor 32. The one or more dispensers 24 are each independently responsive to electrical signals generated by microprocessor 32 and routed to dispensers 24 in part, by power and distribution panels 34 having appropriate cabling and interconnections of storage module 12.

The operation of microprocessor 32 under the control and/or guidance of the system controller provides a system 10 that serves as an "order selection machine" employing dispenser 24. The number of dispensers 24 may be from one to several hundred, and more specifically may be from ten to twenty, dependent upon the number of products to be retrieved from their storage locations, and the speed at which these products are desired to be retrieved by order selection system 10. Order selection system 10 may retrieve packaged items or products 14 from storage locations 16, and may direct such retrieved products into tote 19 on conveyor 18, which transports products 14 to a central collecting station. Microprocessor 32 may be preprogrammed with operating routines that allow for the simultaneous retrieval of products included in different order selection requests from an external source, such as system controller situated at an order/shipment distribution center. The products stocked in the storage locations may be classified as being fast, medium or slow moving, wherein such classifications are meant to represent the public's demand for the product, not the speed in which these products are moved within the system of the present invention.

The public demand classification of the product may be taken into account in the arrangement of system 10. Further, mobile storage module 12 may be installed within system 10 to handle fast moving items based on cyclical demand requirements. Dispenser 24 may be arranged in virtually any configuration desired so as to serve the needs of any external ordering device. Further, dispenser 24 may be configured to cooperate with a single or multiple conveyors 18.

In general, microprocessor 32 of system 10 independently controls the movement of each dispenser 24, and coordinates such movement with each of dispensers 24. Microprocessor 32 may include preprogrammed operating routines. Microprocessor 32 may operate in response to the preprogrammed routines to coordinate and integrate the overall operation of system 10 and/or responsive to the system controller. The routines may be altered so as to accommodate for increases or decreases in any warehouse configuration. Microprocessor 32 may operate on a "real time" basis (immediate response) to the system controller, requesting retrieval of particular products 14 of a specified quantity from storage module 12. The operating routines of microprocessor 32 may provide for response to service a plurality of simultaneously selected order requests from one or more external devices.

Figure 3:
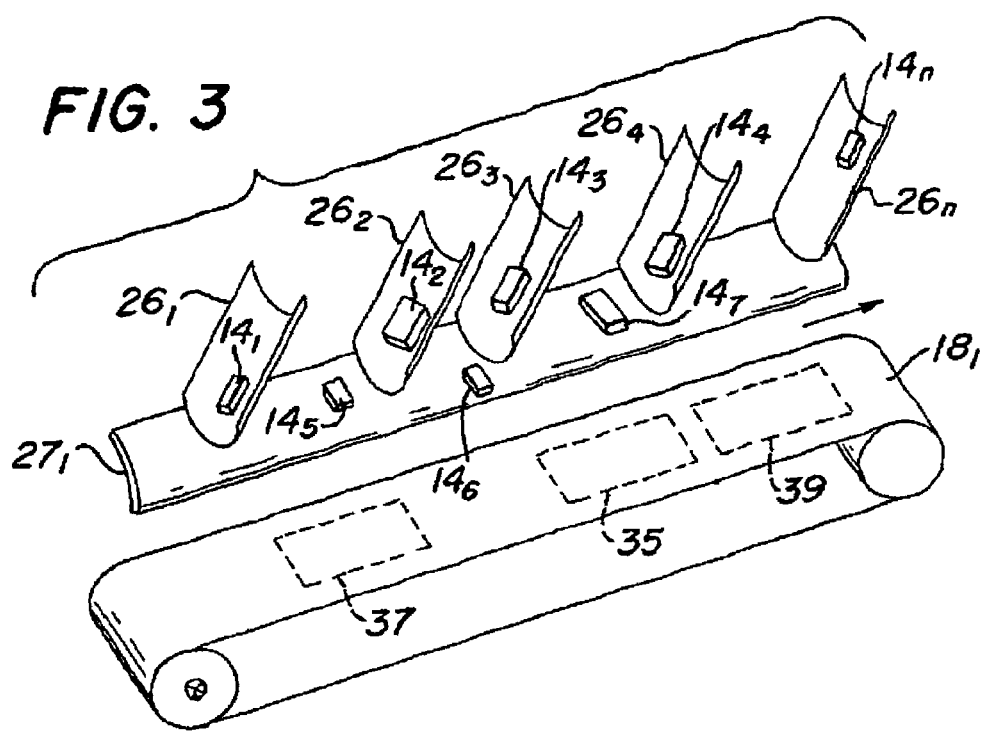
FIG. 3 is an illustration of dynamically assigned order spaces and the corresponding portions of a storage module that provide products to the order spaces.

The operation of microprocessor 32 in controlling storage module 12 within order selection system 10 may be described with reference to FIG. 3, which functionally illustrates the placement of product 14, guided by chutes 26 and sloped member 27, onto one or more assigned order spaces, such as 35, 37 or 39 that may include totes 19 on conveyor 18. Products 14 directed by chutes 26 and sloped members 27 may be retrieved by any stationary dispenser 24 from any storage location 16. Conveyor 18 may be moved in either direction, but is illustrated in FIG. 3 as being moved in the direction indicated by the arrow. Similarly, the length and space between the assigned order spaces 35, 37 and 39 and/or tote 19 may be variable depending upon the space on conveyor 18 assigned by the system controller for carrying these products, but are shown in FIG. 3 for illustrative purposes as being fixed values. The area on the belt occupied by any one order space should not be interrupted or occupied by any other order space.

Storage module 12 may track cartons and/or assigned order spaces on conveyor 18 by using one or more external components such as barcode readers, RF readers, photo-eye arrays, position encoders, light curtains, and other like technologies. This tracking may aid in dispensing and may provide feedback to microprocessor 32. Although a sequential retrieval of products has been assumed, dispenser 24 may have any type of sequence for retrieval of products 14. The sequence of retrieval is defined by the order in which the assigned order spaces are serviced. It should now be appreciated that the practice of the present invention provides for a system controller having a real time response to an external computer and provides dynamic assignment of the assigned order space on conveyor, so as to service simultaneous system order requests from one or more external devices.

Dispensers 24 may be in communication with microprocessor 32, and may send and receive information to and from microprocessor 32. This may include sending sensed information from a sensor(s) to microprocessor 32. For example, a sensor may detect and allow microprocessor 32 to count when each product 14 is retrieved from its storage location 16. A sensor may detect when the associated storage location 16 no longer has any products 14 therein.

These sensors supply microprocessor 32, and ultimately the system controller, with feedback information so that the flow of the retrieval of the desired product from its storage location onto conveyor 18 may be tracked along with the proper operation of each dispenser 24, as the desired product is retrieved from its associated storage location. For example, an optical sensor positioned under product 14 and transmitting an upwardly directed light beam, when not sensing a returned beam (no products in storage locations to reflect the beam downwards) becomes active and, thereby, notifies microprocessor 32 that there are no available products within that particular storage location, so that the controller may alter its operating routines to retrieve that desired product from a different storage location, and also to notify an external monitoring device, such as an operator, that the particular storage location housing the first-sought-after product requires replenishment. Microprocessor 32 looks to a sensor to supply information that the requested product being removed from the storage location has in fact been so removed. This determination occurs because the sensor detects the passage of the leading edge of product 14 on plate 28, for example, as product 14 is being removed or retrieved from its assigned storage location 16.

The system controller may be resident in proximately located conveying equipment. Such proximate equipment may include a system of less mobile equipment to which system 10 is added. This equipment may include known warehousing and other fulfillment equipment. For example, the system depicted in U.S. Pat. No. 5,271,703, may be enhanced by the addition of system 10 as disclosed herein. The system controller may be located with the system of the '703 Patent, by way of example.

Figure 4:
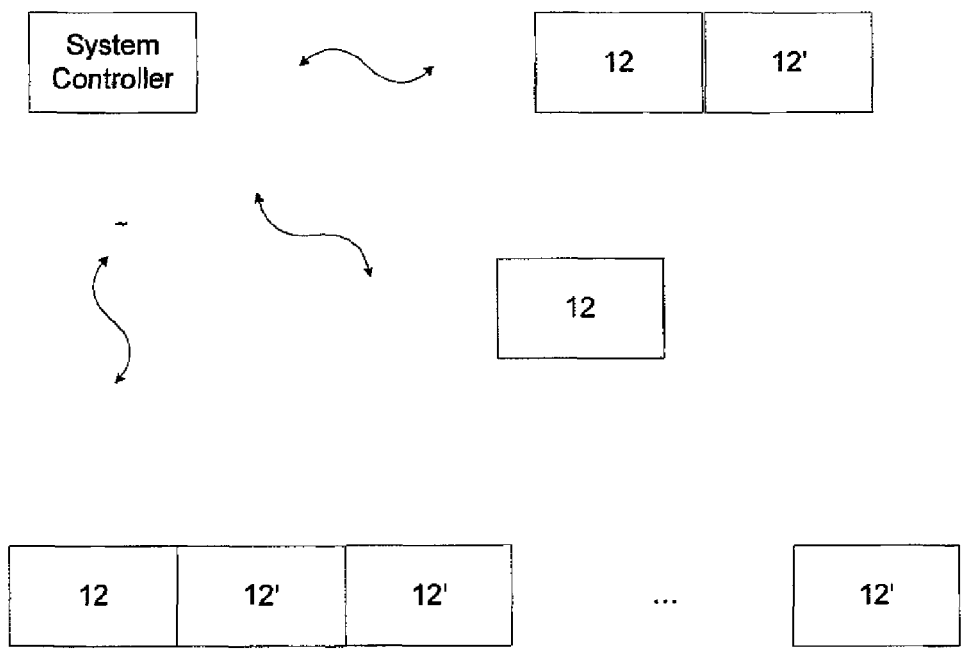
FIG. 4 is a depiction of a system with a series of storage modules wirelessly interconnected with the system controller.

Referring now to FIG. 4 there is shown a configuration of system 10 with a series of storage modules 12 wirelessly interconnected with the system controller. In addition, storage module(s) 12' may be interconnected with storage module 12. Storage modules 12' may include a single storage module 12' interconnected with storage module 12, or may include a series or plurality of storage modules 12' interconnected with a single storage module 12. These modules may be physically connected together to form in essence a larger storage module. For example, storage module 12 may include sixteen storage locations 16, and interconnection of storage module 12 with storage module 12' may provide 32 storage locations. Storage module 12' may derive communications and power from storage module 12 and/or a mating unit, such as storage module 12'. Storage module 12' need not include a microprocessor 32 as it may rely on microprocessor 32 from storage module 12. Storage module 12' may contain some or all of the aforementioned sensors and devices for tracking and inventory detection discussed herein throughout.

Figure 5:
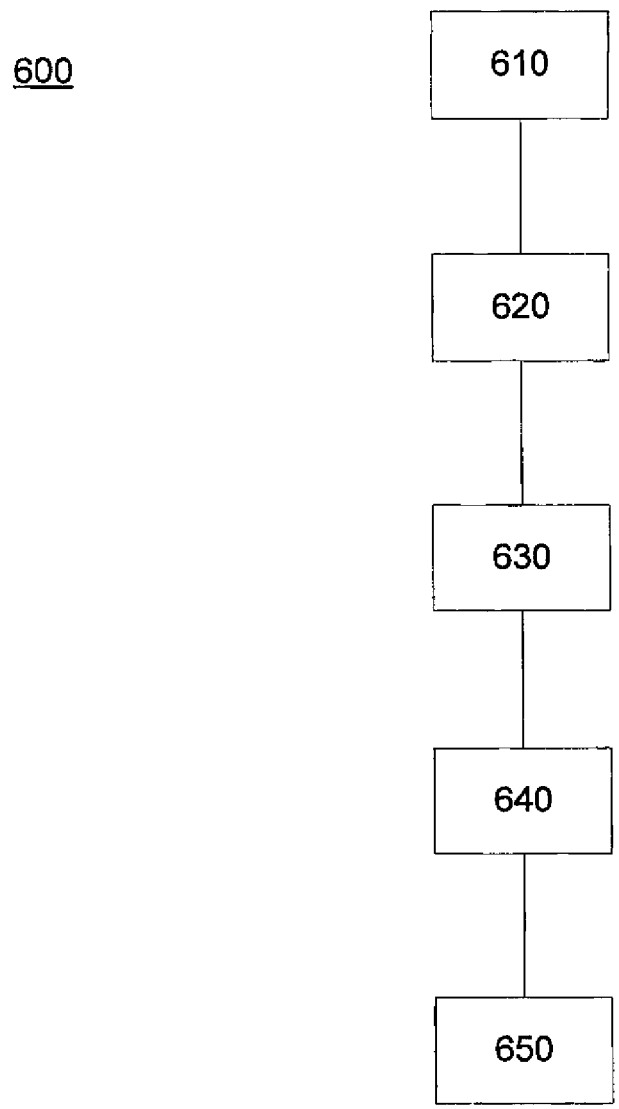
FIG. 5 is an illustration of a method of filling an order with at least one product stored in a predetermined storage location.

Referring now to FIG. 5, there is an illustration of a method 600 of filling an order with at least one product stored in a number of predetermined storage locations. Method 600 may include receiving, at a system controller, order selection information requesting at least one product at step 610. At step 620, method 600 may generate instructions for control of a mobile storage module correspondent to said received order selection information. Method 600 also may include positioning a mobile storage module proximate to the predefined storage location housing the at least one requested product at step 630. At step 640, method 200 may sense at least one product contained with the predefined storage location, and may pick at least one product from the predefined storage location to enable filling of the order at step 650.

The present invention may be embodied in other specific forms without departing from the spirit or essential attributes thereof and, accordingly, reference should be made to the appended claims, rather than to the foregoing specification as indicating the scope of the invention.

Although the disclosed embodiments have been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the claims as set forth hereinafter.

What is claimed is:

1. A mobile fulfillment device for dispensing at least one article stored in one of a plurality of predetermined storage locations, said device comprising: a wireless transceiver for communicating with a remote system controller, including transmission of at least one instruction from the remote system controller to provide instruction to a control system; a dispenser for dispensing the at least one article in response to instruction received from said control system, said fulfillment device being vertically adjustable to enable fulfillment of articles at different heights; a sensor for detecting inventory levels of articles in at least one predetermined storage location; a mobile frame supporting said fulfillment device and said wireless transceiver; and at least three wheels coupled to said mobile frame and providing mobility to the fulfillment device based on at least one of said at least three wheels being a lockable wheel.

2. The device of claim 1, wherein said wireless transceiver receives instructions.

3. The device of claim 2, wherein said instructions include signals indicative of the order selection data.

4. The device of claim 1, wherein said wireless transceiver transmits signals correspondent to signals detected by said sensor.

5. The device of claim 1, further comprising a plurality of storage locations for accommodating additional inventory of the at least one article.

6. The device of claim 1, further comprising a battery for providing at least a portion of electrical power to operate the device.

7. The device of claim 6, wherein said battery is rechargeable.

8. The device of claim 1, further comprising an external power connection for providing at least a portion of electrical power to operate the device.

9. The device of claim 1, further comprising at least one modular connection to enable interconnection of the mobile fulfillment device with at least one other mobile fulfillment device.

10. The device of claim 1, wherein the article is retrieved by said dispenser feeding at least one chute.

11. The device of claim 1, wherein said vertical adjustability allows dispensing of articles with output height ranging from 15 inches to 40 inches relative to the bottom of said mobile frame.

12. An order selection system for filling an order for at least one article stored in one of a plurality of predetermined storage locations said system comprising: a system controller that receives order selection information and generates instructions based on the received order selection information; and a mobile fulfillment device wirelessly communicatively coupled to said system controller, said mobile fulfillment device receiving the generated instructions from said system controller, said mobile fulfillment device comprising: a wireless transceiver for communicating with a remote system controller, including transmission of at least one instruction from the remote system controller to provide instruction to said control system; a dispenser for dispensing the at least one product responsive to instructions from said control system, said retriever being vertically adjustable in response to signals from said control system to enable retrieval of products stored at different heights; a sensor for detecting inventory levels of products in at least one predetermined storage location; and a mobile frame supporting said fulfillment device, said mobile frame including at least three wheels providing mobility to the fulfillment device based on at least one of said at least three wheels being a lockable wheel.

13. The system of claim 12, wherein said wireless transceiver receives instructions.

14. The system of claim 13, wherein said instructions include signals indicative of the order selection data.

15. The system of claim 12, wherein said wireless transceiver transmits signals correspondent to signals detected by said sensor.

16. The system of claim 13, further comprising a plurality of storage locations for accommodating additional inventory of the at least one article.

17. The system of claim 13, further comprising a battery for providing at least a portion of electrical power to operate the device.

18. The system of claim 17, wherein said battery is rechargeable.

19. The system of claim 12, further comprising an external power connection for providing at least a portion of electrical power to operate the device.

20. The system of claim 12, further comprising at least one modular connection to enable interconnection of the mobile fulfillment device with at least one other mobile fulfillment device.

21. The system of claim 12, wherein the article is retrieved by said dispenser feeding at least one chute.

22. The system of claim 12, wherein said vertical adjustability allows dispensing of articles with output height ranging from 15 inches to 40 inches relative to the bottom of said mobile frame.

23. The system of claim 13, further comprising a conveyor operatively associated said mobile fulfillment device to receive the at least one article dispensed by said dispenser and adapted to transport the article in fulfillment of the order.

24. The system of claim 23, further comprising a tracker for tracking at least one article on said conveyor.

25. The system of claim 24, wherein said wireless transceiver transmits a signal correspondent to information detected by said tracker.

* * * * *